United States Patent
Xu (10) Patent No.: US 12,260,103 B1
(45) Date of Patent: Mar. 25, 2025

(54) RANGE DEVIATION BASED NAMESPACE REBALANCING IN A DISTRIBUTED STORAGE NETWORK

(71) Applicant: International Business Machines Corporation, Armonk, NY (US)

(72) Inventor: Huiying Xu, Morton Grove, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/427,876

(22) Filed: Jan. 31, 2024

(51) Int. Cl.
*G06F 3/06* (2006.01)

(52) U.S. Cl.
CPC .......... *G06F 3/0644* (2013.01); *G06F 3/0608* (2013.01); *G06F 3/067* (2013.01)

(58) Field of Classification Search
CPC ....... G06F 3/0644; G06F 3/0608; G06F 3/067
See application file for complete search history.

(56) References Cited

U.S. PATENT DOCUMENTS

| | | | |
|---|---|---|---|
| 7,937,421 B2 | 5/2011 | Mikesell et al. | |
| 8,694,752 B2 | 4/2014 | Gladwin et al. | |
| 8,909,858 B2 | 12/2014 | Resch et al. | |
| 10,084,770 B2 | 9/2018 | Motwani et al. | |
| 10,365,968 B2 | 7/2019 | Motwani | |
| 10,452,317 B2 | 10/2019 | Resch et al. | |
| 10,592,479 B2 | 3/2020 | Bhagwat et al. | |
| 10,904,336 B2 | 1/2021 | Motwani et al. | |
| 10,936,452 B2 | 3/2021 | Wozniak et al. | |
| 2003/0115218 A1 | 6/2003 | Bobbitt et al. | |
| 2012/0117351 A1 | 5/2012 | Motwani et al. | |
| 2014/0006465 A1* | 1/2014 | Davis .................. | G06F 16/1752 707/827 |
| 2017/0147219 A1 | 5/2017 | Leggette et al. | |
| 2018/0337997 A1* | 11/2018 | Motwani ............. | H04L 67/1097 |
| 2019/0158595 A1 | 5/2019 | Motwani et al. | |
| 2019/0227718 A1* | 7/2019 | Frolikov ............. | G06F 12/0246 |
| 2019/0303006 A1 | 10/2019 | Wozniak | |

(Continued)

OTHER PUBLICATIONS

Anonymous, "Dispersed Storage Namespace Health Based Device Prioritization", IPCOM000263306D, Aug. 17, 2020, 7 pages.

(Continued)

*Primary Examiner* — Ryan Bertram
(74) *Attorney, Agent, or Firm* — CANTOR COLBURN LLP; Teddi Maranzano (57) ABSTRACT

Computer-implemented methods for rebalancing a namespace range of a dispersed storage network (DSN) are provided. Aspects include calculating a namespace imbalance factor for each of a plurality of storage devices in the DSN, identifying a source storage device of the DSN having a largest namespace imbalance factor, determining a minimum namespace address, a maximum namespace address, an ideal minimum namespace address, and an ideal maximum namespace address for the source storage device, and based at least in part on a determination that the minimum namespace address is less than the ideal minimum namespace address and/or the maximum namespace address is greater than the ideal maximum namespace address, reassigning the left-deviated or right-deviated portion of the namespace range from the source storage device to its left or right neighbor storage device of the DSN.

20 Claims, 7 Drawing Sheets

(56) References Cited

U.S. PATENT DOCUMENTS

2020/0151068 A1    5/2020  Wozniak et al.
2024/0303114 A1*  9/2024  Sabesan ................ G06F 3/0604

OTHER PUBLICATIONS

IBM: List of IBM Patents or Patent Applications Treated as Related (Appendix P); Date Filed: Jun. 12, 2024, 2 pages.
Xu, "Rebalancing in a Distributed Storage Network Based on Both Range and Usage Imbalances," U.S. Appl. No. 18/740,583, filed Jun. 12, 2024.
H. Xu, "Namespace range rebalancing policies in a dispersed storage unit." [PowerPoint slides].2023. 16pages.

* cited by examiner

RANGE DEVIATION BASED NAMESPACE REBALANCING IN A DISTRIBUTED STORAGE NETWORK

BACKGROUND

This disclosure relates generally to computer networks and more particularly to performing range deviation based namespace rebalancing in a distributed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via a computer, to store files, applications, etc. on an Internet storage system. The Internet storage system may include a RAID (redundant array of independent disks) system and/or a dispersed storage system that uses an error correction scheme to encode data for storage.

SUMMARY

Embodiments of the present disclosure are directed to computer-implemented methods for performing range deviation based namespace rebalancing in a distributed storage network. According to an aspect, a computer-implemented method includes calculating a namespace imbalance factor for each of a plurality of storage devices in the DSN, wherein the namespace range is split among the plurality of storage devices, which each has a device number and the plurality of storage devices are logically arranged in ascending order based on the device number. The method also includes identifying a source storage device of the DSN, wherein the source storage device of the DSN is identified based on a determination that it has a largest namespace imbalance factor and determining a minimum namespace address, a maximum namespace address, an ideal minimum namespace address, and an ideal maximum namespace address for the source storage device. Based at least in part on a determination that the minimum namespace address is less than the ideal minimum namespace address and the maximum namespace address is less than or equal to the ideal maximum namespace address, the method includes reassigning the left-deviated portion of the namespace range from the source storage device to its left neighbor storage device of the DSN, wherein the device number of the left neighbor storage device is one less than the device number of the source storage device. Based at least in part on a determination that the maximum namespace address is greater than the ideal maximum namespace address, the method includes reassigning the right-deviated portion of the namespace range from the source storage device to its right neighbor storage device of the DSN, wherein the device number of the right neighbor storage device is one greater than the device number of the source storage device.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
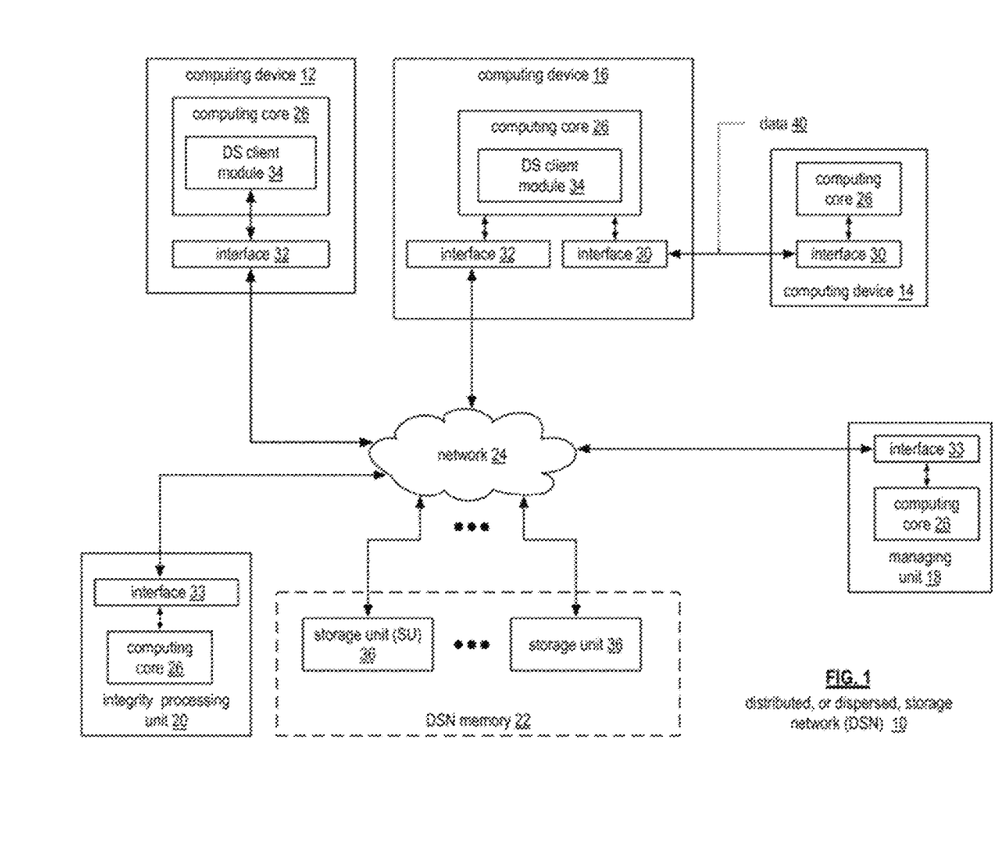
FIG. 1 is a schematic block diagram of an embodiment of a dispersed or distributed storage network (DSN) in accordance with an embodiment of the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
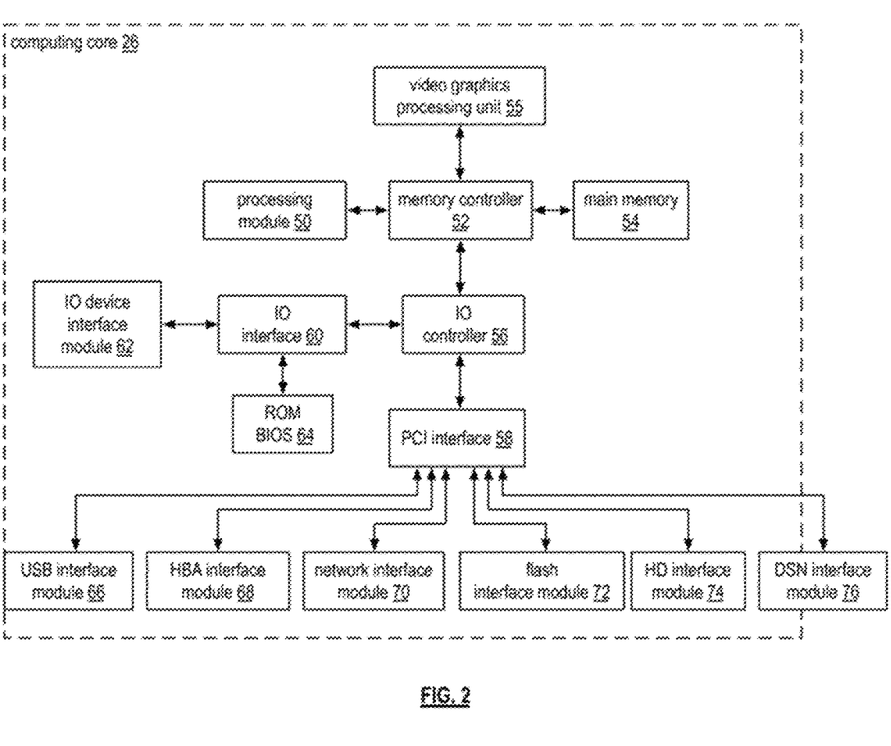
FIG. 2 is a schematic block diagram of an embodiment of a computing core in accordance with an embodiment of the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 62, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
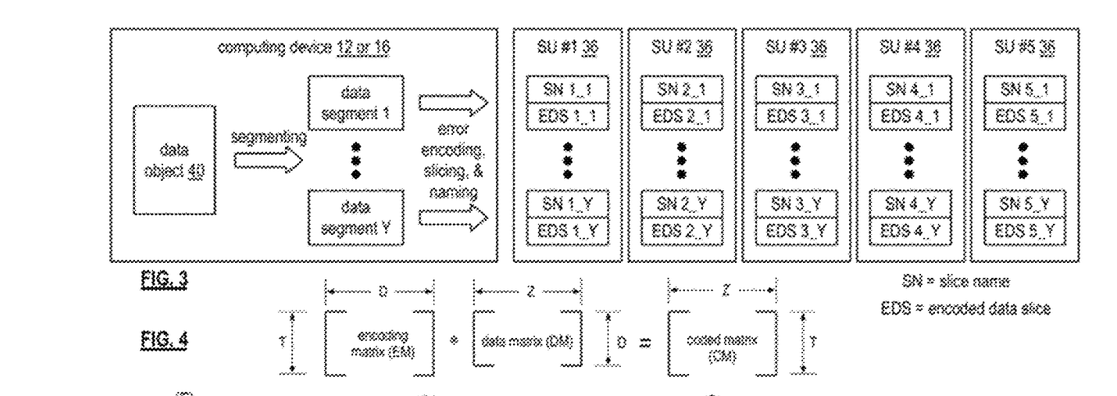
FIG. 3 is a schematic block diagram of an example of dispersed storage error encoding of data in accordance with an embodiment of the present disclosure.
FIG. 4 is a schematic block diagram of a generic example of an error encoding function in accordance with an embodiment of the present disclosure.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
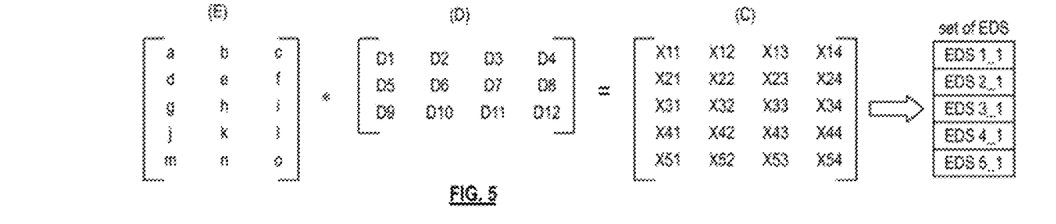
FIG. 5 is a schematic block diagram of a specific example of an error encoding function in accordance with an embodiment of the present disclosure.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
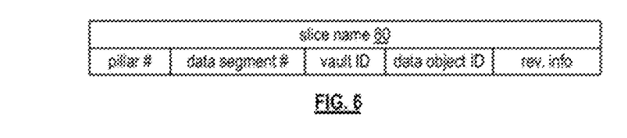
FIG. 6 is a schematic block diagram of an example of a slice name of an encoded data slice (EDS) in accordance with an embodiment of the present disclosure.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
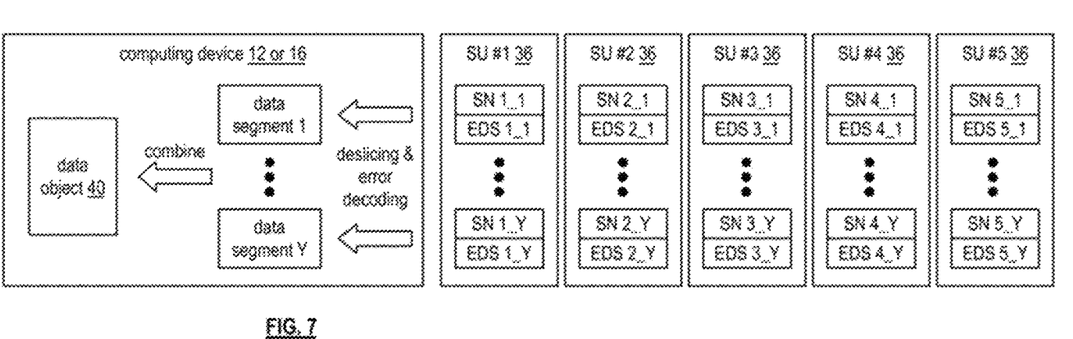
FIG. 7 is a schematic block diagram of an example of dispersed storage error decoding of data in accordance with an embodiment of the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
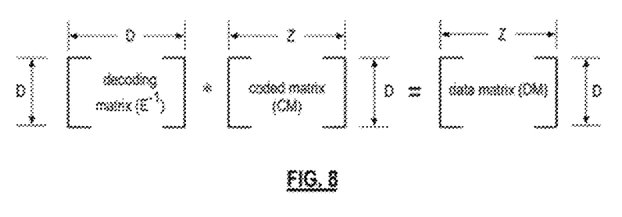
FIG. 8 is a schematic block diagram of a generic example of an error decoding function in accordance with an embodiment of the present disclosure.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
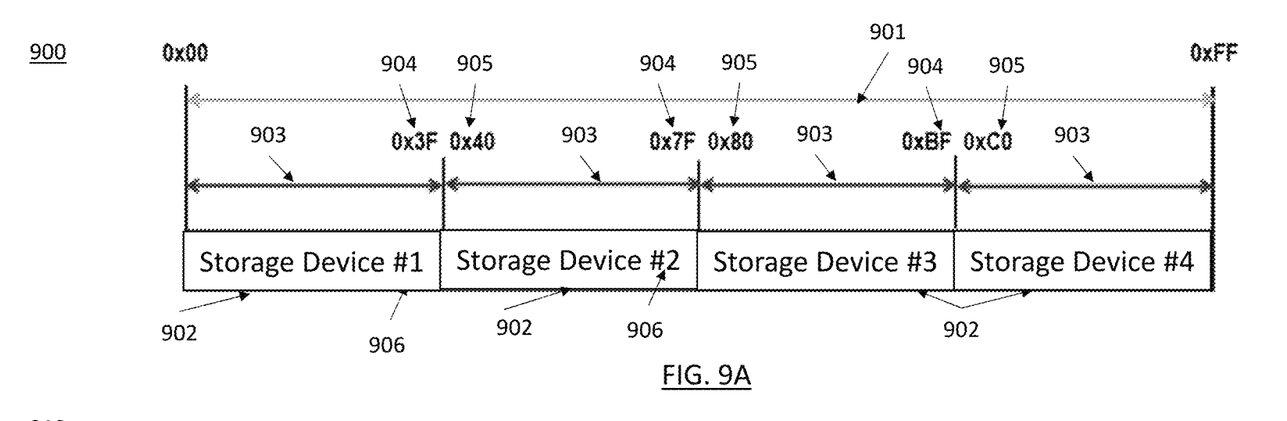
FIG. 9A is a schematic diagram illustrating an ideal distribution of a namespace range among a plurality of storage devices of a dispersed storage network in accordance with an embodiment of the present disclosure.

In each storage unit 36, all the storage devices 902 share the whole namespace range 901, and each owns a portion. A slice name is just like a memory address in a computing system, and the whole namespace range is just like the memory address space. Given an EDS, its slice name decides which storage device it will be stored into. The DS Client module 34 always tends to generate the slice names uniformly distributed in the whole namespace range. Therefore, the wider is the portion of the whole namespace range a storage device owns, the more EDS will be stored into this storage device; vice versa. The migration of portion of namespace range can only happen between two adjacent storage devices, either migrate the left part or the whole of the portion of namespace range a storage device owns to its left neighbor storage device, or migrate the right part or the whole of the portion of namespace range a storage device owns to its right neighbor storage device.

Referring now to FIG. 9A, a schematic diagram 900 illustrating an ideal distribution of a namespace range 901 among a plurality of storage devices 902 of a dispersed storage network is shown. In exemplary embodiments, the namespace range 901 is split among the storage devices 902 of the dispersed storage network proportionally based on the storage capacity of the storage devices 902. In the illustrated embodiment, the namespace range 901 ranges from address 0x00 to 0xFF and is split evenly among four storage devices 902, i.e., the four storage devices 902 have the same storage capacity. Each storage device 902 includes an ideal namespace range 903 that ranges from a minimum ideal namespace address 905 to a maximum ideal namespace address 904.

Each of the storage devices 902 is assigned a device number 906. In exemplary embodiments, the storage devices 902 are logically arranged in ascending order based on the device number 906. As a result, the maximum ideal namespace address 904 of a storage device 902 having device number N, will be one less than the minimum ideal namespace address 905 of a storage device 902 having device number N+1. Likewise, the minimum ideal namespace address 905 of a storage device 902 having device number N will be one greater than the maximum ideal namespace address 904 of a storage device 902 having device number N-1.

In exemplary embodiments, when a dispersed storage network is initially provisioned, namespace range 901 is split among the storage devices 902 proportionally based on the storage capacity of the storage devices 902, which results in the ideal distribution of a namespace range 901, as shown in diagram 900. During the operation of the dispersed storage network, the actual distribution of the namespace range 901 among the storage device 902 may deviate from the ideal distribution due to a variety of factors. For example, one of the storage devices 902 may malfunction and be brought out of service so that the namespace range portion it owns is taken by its neighbor storage devices immediately. In another example, a new storage device is added to the dispersed storage network, and it owns the zero width of namespace range portion at the beginning.

Figure 9B:
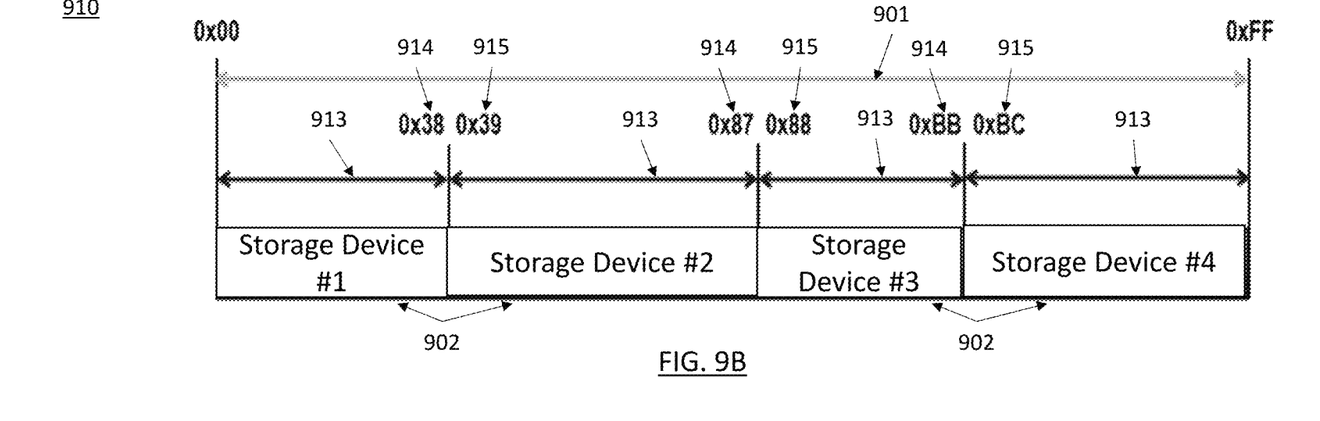
FIG. 9B is a schematic diagram illustrating an actual distribution of a namespace range among a plurality of storage devices of a dispersed storage network in accordance with an embodiment of the present disclosure.

Referring now to FIG. 9B, a schematic diagram 910 illustrating an actual distribution of a namespace range 901 among a plurality of storage devices 902 of a dispersed storage network in accordance with an embodiment of the present disclosure is shown. In exemplary embodiments, the namespace range 901 is split among the storage devices 902 of the dispersed storage network. In the illustrated embodiment, the namespace range 901 ranges from address 0x00 to 0xFF and is not evenly split among four storage devices 902. Each storage device 902 includes an actual namespace range 913 that ranges from a minimum namespace address 915 to a maximum namespace address 914.

As shown in the difference between diagrams 900 and 910, the actual distribution of a namespace range 901 among a plurality of storage devices 902 is not the same as the ideal distribution of a namespace range 901 among a plurality of storage devices 902. For example, the minimum ideal namespace address 905 of storage device 1 is 0x3F and it is not equal to the minimum namespace address 915 of storage device 1, which is 0x38. The wider is the namespace range portion a storage device owns, the higher probability this storage device will receive the EDS to store; vice versa. Therefore, the storage devices owning wider namespace range portions will be filled much quickly than those storage devices owning narrower namespace range portions. If an EDS is to be stored in a near full storage device, the storing operation will probably fail, and the data may be lost.

In exemplary embodiments, based on the severity of the difference between the actual distribution and the ideal distribution of a namespace range 901 among a plurality of storage devices 902, the namespace range 901 will be rebalanced among the plurality of storage devices 902. In exemplary embodiments, the severity of the difference between the actual distribution and the ideal distribution of a namespace range is determined based on a namespace imbalance factor calculated for each of the storage devices 902. In one embodiment, the namespace imbalance factor for a storage device is calculated as the maximum namespace address minus the minimum namespace address divided by the ideal maximum namespace address minus the ideal minimum namespace address. In exemplary embodiments, the namespace imbalance factor is calculated for each storage device and based on a determination that the largest namespace imbalance factor is greater than a threshold value, the namespace range 901 will be rebalanced among the plurality of storage devices 902. In exemplary embodiment, rebalancing the namespace range 901 among the plurality of storage devices 902 includes reassigning a portion of a namespace range assigned to storage device N to one or more of storage devices N-1 or N+1. Here, the storage device N is the source storage device, and the storage device N-1 or N+1 is the destination storage device.

Figure 10:
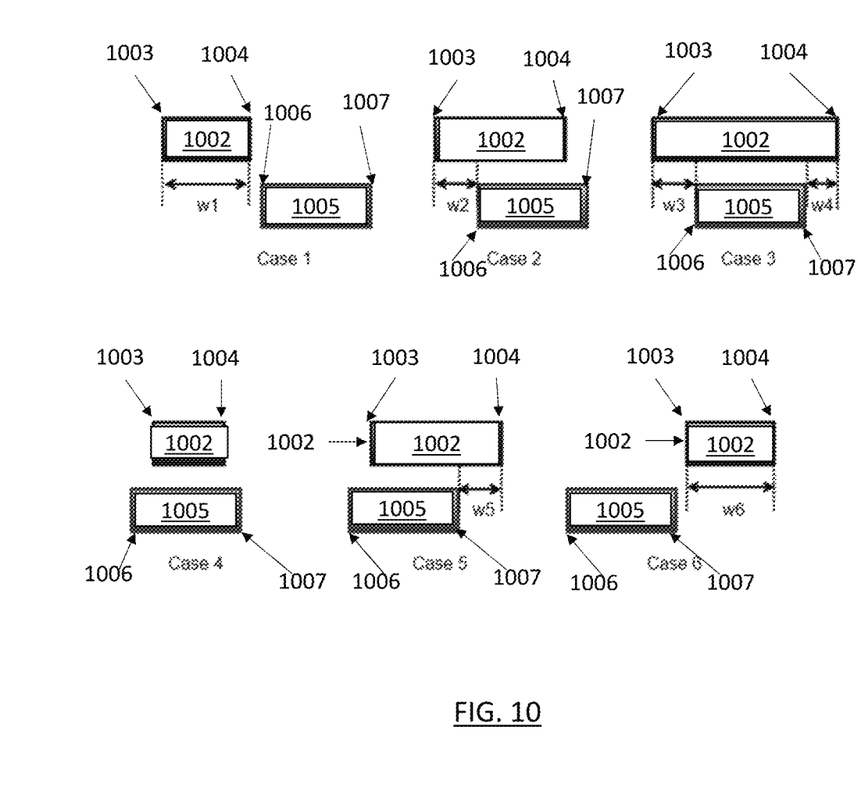
FIG. 10 is a schematic diagram illustrating a plurality of deviations between an actual namespace range assigned to a storage device and an ideal namespace range for the storage device in accordance with an embodiment of the present disclosure.

Referring now to FIG. 10, a schematic diagram illustrating a plurality of deviations between an actual namespace range 1002 assigned to a storage device and an ideal namespace range 1005 for the storage device in accordance with an embodiment of the present disclosure are shown. As illustrated, each storage device has a minimum namespace address 1003 and a maximum namespace address 1004 which defines the actual namespace range 1002. In addition, each storage device has an ideal minimum namespace address 1006 and an ideal maximum namespace address 1007 which defines the ideal namespace range 1005. As illustrated, in various cases the minimum namespace address 1003 may be greater than, equal to, or less than the ideal minimum namespace address 1006 and the maximum namespace address 1004 may be greater than, equal to, or less than the ideal maximum namespace address 1007. In exemplary embodiments, the deviation between the minimum namespace address 1003 and the ideal minimum namespace address 1006 and the deviation between the maximum namespace address 1004 and the ideal maximum namespace address 1007 are utilized to determine how to perform the rebalancing of the namespace range among the plurality of storage devices of the dispersed storage network.

In one embodiment, for the illustrated case 1, the whole actual namespace range 1002 (i.e. w1) is left-deviated from the ideal namespace range 1005, rebalancing of the namespace range will migrate the left-deviated namespace range (i.e. w1) from storage device number N to its left neighbor storage device N−1, no matter if the actual and ideal namespace ranges are adjacent to each other or not, provided that storage device N−1 has sufficient storage capacity. In another embodiment, for illustrated case 2, partial of actual namespace range 1002 is deviated from the ideal namespace range 1005, rebalancing of the namespace range will migrate the left-deviated namespace range portion (i.e. w2) from storage device number N to its left neighbor storage device N−1, provided that storage device N−1 has sufficient storage capacity. For both the cases 1 and 2, the storage device N is the source storage device, and the storage device N−1 is the destination storage device for rebalancing.

In one embodiment, for the illustrated case 3, rebalancing of the namespace range from storage device number N to storage device N−1 or storage device N+1 will depend on the comparison of the widths of the left-deviated namespace ranges portion w3 and the right-deviated namespace range portion w4. If w3 is wider than w4 and the storage device N−1 has enough space, rebalancing of the namespace range will migrate the left-deviated namespace range portion w3 from storage device number N to its left neighbor storage device N−1. The storage device N is the source storage device, and the storage device N−1 is the destination storage device for rebalancing for this condition. Otherwise, rebalancing the namespace range will migrate the right-deviated namespace range portion w4 from storage device number N to its right neighbor storage device N+1 as long as storage device N+1 has sufficient storage capacity. The storage device N+1 is the destination storage device for this condition. In exemplary embodiments, no rebalancing of the namespace range from storage device number N is needed in case 4 because the actual namespace range 1002 is completely within the ideal namespace range 1005.

In one embodiment, for the illustrated case 5, partial of the actual namespace range 1002 is right-deviated from the ideal namespace range, rebalancing of the namespace range will migrate the right-deviated portion of namespace range (i.e. w5) from storage device number N to its right neighbor storage device N+1, provided storage device N+1 has sufficient storage capacity. In one embodiment, for the illustrated case 6, rebalancing of the namespace range will migrate the right-deviated namespace range (i.e. w6) from storage device number N to its right neighbor storage device N+1, no matter if it is adjacent to the ideal namespace range or not, provided storage device N+1 has sufficient storage capacity. For both the cases 5 and 6, the storage device N is the source storage device, and the storage device N+1 is the destination storage device for rebalancing.

Figure 11:
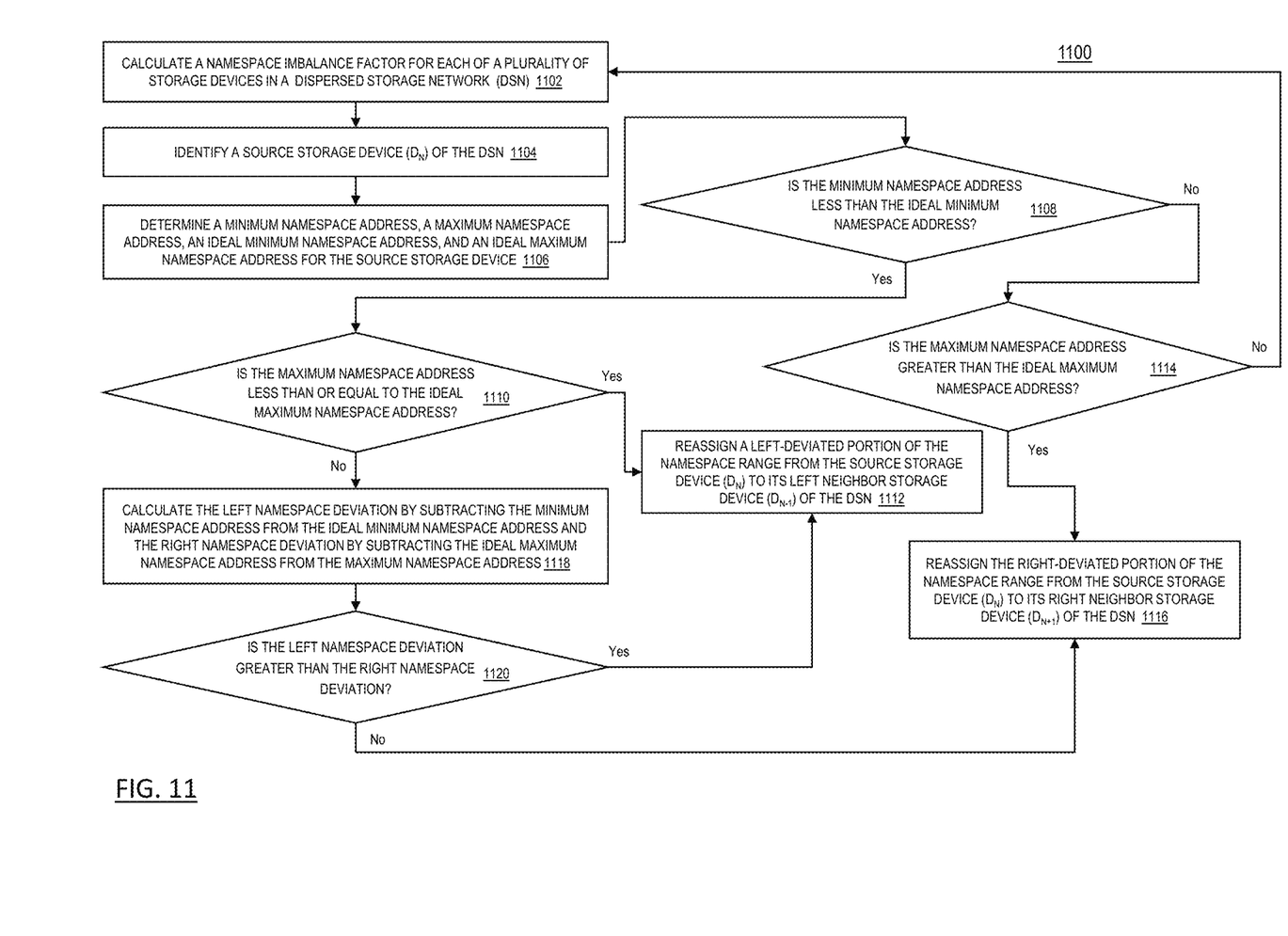
FIG. 11 is a flowchart diagram illustrating a method for performing range deviation based namespace rebalancing in a distributed storage network in accordance with an embodiment of the present disclosure.

Referring now to FIG. 11, a flowchart diagram illustrating a method 1100 for performing range deviation based namespace rebalancing in a distributed storage network in accordance with an embodiment of the present disclosure is shown. In exemplary embodiments, the method 1100 is performed in each of the storage units 36, respectively, as shown in FIG. 1. The method 1100 begins at block 1102 by calculating a namespace imbalance factor for each of a plurality of storage devices in a dispersed storage network (DSN). In exemplary embodiments, the namespace imbalance factor of a storage device is calculated as the maximum namespace address minus the minimum namespace address divided by the ideal maximum namespace address minus the ideal minimum namespace address. Next, as shown at block 1104, the method 1100 includes identifying a storage device of the DSN as the source storage device for rebalancing. In one embodiment, the source storage device is identified as the storage device of the storage devices that has the largest namespace imbalance factor. In another embodiment, the source storage device of the DSN is identified based on a determination that the namespace imbalance factor is greater than a threshold minimum value.

As shown at block 1106, the method 1100 includes determining a minimum namespace address, a maximum namespace address, an ideal minimum namespace address, and an ideal maximum namespace address for the source storage device. Next, as shown at decision block 1108, the method 1100 includes determining whether the minimum namespace address is less than the ideal minimum namespace address. Based on a determination that the minimum namespace address is less than the ideal minimum namespace address, the method 1100 proceeds to decision block 1110. Otherwise, the method proceeds to decision block 1114. At decision block 1110, the method 1100 includes determining whether the maximum namespace address is less than or equal to the ideal maximum namespace address. At decision block 1114, the method 1100 includes determining whether the maximum namespace address is greater than the ideal maximum namespace address.

Based on a determination that the maximum namespace address less than or equal to the ideal maximum namespace address, the method 1100 proceeds to block 1112 and reassigns a left-deviated portion of the namespace range from the source storage device to its left neighbor storage device of the DSN, as the case 1 in the FIG. 10. In exemplary embodiments, the source storage device has a device number of N and its left neighbor storage device has a device number of N−1. In exemplary embodiments, the left-deviated portion of the namespace range is determined based at least in part on an available storage capacity of the left neighbor storage device.

Based on a determination that the maximum namespace address is greater than the ideal maximum namespace address, the method 1100 proceeds to block 1116 and reassigns a right-deviated portion of the namespace range from the source storage device to its right neighbor storage device of the DSN, as the cases 5 and 6 in FIG. 10. In exemplary embodiments, the source storage device has a device number of N and the right-neighbor storage device has a device number of N+1. In exemplary embodiments, the right-deviated portion of the namespace range is determined based at least in part on an available storage capacity of the third storage device.

At block 1118, the method 1100 includes calculating the left namespace deviation by subtracting the minimum namespace address from the ideal minimum namespace address and the right namespace deviation by subtracting the ideal maximum namespace address from the maximum namespace address if the maximum namespace address is larger than the ideal maximum namespace address, as the case 3 in FIG. 10. If the maximum namespace address is less than or equal to the ideal maximum namespace address, as the case 2 in FIG. 10, there is no right namespace deviation. The width of right-deviated portion of namespace range is considered as 0 for this case. Next, as shown at decision block 1120, the method 1100 includes determining whether the left-deviated portion of namespace range is wider than the right-deviated portion of namespace range. Based on a determination that the left-deviated portion of namespace range is wider than the right-deviated portion of namespace range, the method 1100 proceeds to block 1112. Based on a determination that the left-deviated portion of namespace range is not wider than the right-deviated portion of namespace range, the method 1100 proceeds to block 1116. In exemplary embodiments, the method 1100 includes recalculating the namespace imbalance factor for each of the plurality of storage devices in the DSN after completion of one of the reassigning the left-deviated portion of the namespace range from the source storage device to its left neighbor storage device of the DSN and the reassigning the right-deviated portion of the namespace range from the source storage device to its right neighbor storage device of the DSN.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for rebalancing a namespace range of a dispersed storage network (DSN), the method comprising:
calculating a namespace imbalance factor for each of a plurality of storage devices in the DSN, wherein the namespace range is split among the plurality of storage devices, which each has a device number and the plurality of storage devices are logically arranged in ascending order based on the device number;
identifying a source storage device of the DSN, wherein the source storage device of the DSN is identified based on a determination that it has a largest namespace imbalance factor;
determining a minimum namespace address, a maximum namespace address, an ideal minimum namespace address, and an ideal maximum namespace address for the source storage device;
based at least in part on a determination that the minimum namespace address is less than the ideal minimum namespace address and the maximum namespace address is less than or equal to the ideal maximum namespace address, reassigning a left-deviated portion of the namespace range from the source storage device to a left neighbor storage device of the DSN, wherein the device number of the left neighbor storage device is one less than the device number of the source storage device; and
based at least in part on a determination that the maximum namespace address is greater than the ideal maximum namespace address, reassigning a right-deviated portion of the namespace range from the source storage device to a right neighbor storage device of the DSN, wherein the device number of the right neighbor storage device is one greater than the device number of the source storage device.

2. The method of claim 1, further comprising:
based at least in part on a determination that the minimum namespace address is less than the ideal minimum namespace address and the maximum namespace address is greater than the ideal maximum namespace address:
calculating the left-deviated portion of namespace range by subtracting the minimum namespace address from the ideal minimum namespace address;
calculating the right-deviated portion of namespace range by subtracting the ideal maximum namespace address from the maximum namespace address;
based at least in part on a determination that the left-deviated portion of namespace range is wider than the right-deviated portion of namespace range, reassigning the left-deviated portion of the namespace range from the source storage device to its left neighbor storage device of the DSN; and
based at least in part on a determination that the left-deviated portion of namespace range is not wider than the right-deviated portion of the namespace range, reassigning the right-deviated portion of the namespace range from the source storage device to its right neighbor storage device of the DSN.

3. The method of claim 2, wherein the left-deviated portion of the namespace range is determined based at least in part on an available storage capacity of its left neighbor storage device.

4. The method of claim 2, wherein the right-deviated portion of the namespace range is determined based at least in part on an available storage capacity of its right neighbor storage device.

5. The method of claim 2, further comprising recalculating the namespace imbalance factor for each of the plurality of storage devices in the DSN after completion of one of the reassigning the left-deviated portion of the namespace range from the source storage device to its left neighbor storage device of the DSN and the reassigning the right-deviated portion of the namespace range from the source storage device to its right neighbor storage device of the DSN.

6. The method of claim 1, wherein the source storage device of the DSN is identified based on a determination the namespace imbalance factor is greater than a threshold minimum value.

7. The method of claim 1, wherein the namespace imbalance factor for a storage device is calculated as the maximum namespace address minus the minimum namespace address divided by the ideal maximum namespace address minus the ideal minimum namespace address.

8. A computing system having a memory having computer readable instructions and one or more processors for executing the computer readable instructions, the computer readable instructions controlling the one or more processors to perform operations comprising:
calculating a namespace imbalance factor for each of a plurality of storage devices in a dispersed storage network (DSN) having a namespace range, wherein the namespace range is split among the plurality of storage devices, which each has a device number and the plurality of storage devices are logically arranged in ascending order based on the device number;
identifying a source storage device of the DSN, wherein the source storage device of the DSN is identified based on a determination that it has a largest namespace imbalance factor;
determining a minimum namespace address, a maximum namespace address, an ideal minimum namespace address, and an ideal maximum namespace address for the source storage device;
based at least in part on a determination that the minimum namespace address is less than the ideal minimum namespace address and the maximum namespace address is less than or equal to the ideal maximum namespace address, reassigning a left-deviated portion of the namespace range from the source storage device to a left neighbor storage device of the DSN, wherein the device number of the left neighbor storage device is one less than the device number of the source storage device; and
based at least in part on a determination that the maximum namespace address is greater than the ideal maximum namespace address, reassigning a right-deviated portion of the namespace range from the source storage device to a right neighbor storage device of the DSN, wherein the device number of the right neighbor storage device is one greater than the device number of the source storage device.

9. The computing system of claim 8, wherein the operations further comprise:
based at least in part on a determination that the minimum namespace address is less than the ideal minimum namespace address and the maximum namespace address is greater than the ideal maximum namespace address:

calculating the left-deviated portion of namespace range by subtracting the minimum namespace address from the ideal minimum namespace address;

calculating the right-deviated portion of namespace range by subtracting the ideal maximum namespace address from the maximum namespace address;

based at least in part on a determination that the left-deviated portion of namespace range is wider than the right-deviated portion of namespace range, reassigning the left-deviated portion of the namespace range from the source storage device to its left neighbor storage device of the DSN; and based at least in part on a determination that the left-deviated portion of namespace range is not wider than the right-deviated portion of the namespace range, reassigning the right-deviated portion of the namespace range from the source storage device to its right neighbor storage device of the DSN.

10. The computing system of claim 9, wherein the left-deviated portion of the namespace range is determined based at least in part on an available storage capacity of its left neighbor storage device.

11. The computing system of claim 9, wherein the right-deviated portion of the namespace range is determined based at least in part on an available storage capacity of its right neighbor storage device.

12. The computing system of claim 9, wherein the operations further comprise recalculating the namespace imbalance factor for each of the plurality of storage devices in the DSN after completion of one of the reassigning the left-deviated portion of the namespace range from the source storage device to its left neighbor storage device of the DSN and the reassigning the right-deviated portion of the namespace range from the source storage device to its right neighbor storage device of the DSN.

13. The computing system of claim 8, wherein the source storage device of the DSN is identified based on a determination the namespace imbalance factor is greater than a threshold minimum value.

14. The computing system of claim 8, wherein the namespace imbalance factor for a storage device is calculated as the maximum namespace address minus the minimum namespace address divided by the ideal maximum namespace address minus the ideal minimum namespace address.

15. A computer program product comprising a computer readable storage medium having program instructions embodied therewith, the program instructions executable by a processor to cause the processor to perform operations comprising:

calculating a namespace imbalance factor for each of a plurality of storage devices in a dispersed storage network (DSN) having a namespace range, wherein the namespace range is split among the plurality of storage devices, which each has a device number and the plurality of storage devices are logically arranged in ascending order based on the device number;

identifying a source storage device of the DSN, wherein the source storage device of the DSN is identified based on a determination that it has a largest namespace imbalance factor;

determining a minimum namespace address, a maximum namespace address, an ideal minimum namespace address, and an ideal maximum namespace address for the source storage device;

based at least in part on a determination that the minimum namespace address is less than the ideal minimum namespace address and the maximum namespace address is less than or equal to the ideal maximum namespace address, reassigning a left-deviated portion of the namespace range from the source storage device to a left neighbor storage device of the DSN, wherein the device number of the left neighbor storage device is one less than the device number of the source storage device; and based at least in part on a determination that the maximum namespace address is greater than the ideal maximum namespace address, reassigning a right-deviated portion of the namespace range from the source storage device to a right neighbor storage device of the DSN, wherein the device number of the right neighbor storage device is one greater than the device number of the source storage device.

16. The computer program product of claim 15, wherein the operations further comprise:

based at least in part on a determination that the minimum namespace address is less than the ideal minimum namespace address and the maximum namespace address is greater than the ideal maximum namespace address:

calculating the left-deviated portion of namespace range by subtracting the minimum namespace address from the ideal minimum namespace address;

calculating the right-deviated portion of namespace range by subtracting the ideal maximum namespace address from the maximum namespace address;

based at least in part on a determination that the left-deviated portion of namespace range is wider than the right-deviated portion of namespace range, reassigning the left-deviated portion of the namespace range from the source storage device to its left neighbor storage device of the DSN; and based at least in part on a determination that the left-deviated portion of namespace range is not wider than the right-deviated portion of the namespace range, reassigning the right-deviated portion of the namespace range from the source storage device to its right neighbor storage device of the DSN.

17. The computer program product of claim 16, wherein the left-deviated portion of the namespace range is determined based at least in part on an available storage capacity of its left neighbor storage device.

18. The computer program product of claim 16, wherein the right-deviated portion of the namespace range is determined based at least in part on an available storage capacity of its right neighbor storage device.

19. The computer program product of claim 16, wherein the operations further comprise recalculating the namespace imbalance factor for each of the plurality of storage devices in the DSN after completion of one of the reassigning the left-deviated portion of the namespace range from the source storage device to its left neighbor storage device of the DSN and the reassigning the right-deviated portion of the namespace range from the source storage device to its right neighbor storage device of the DSN.

20. The computer program product of claim 15, wherein the source storage device of the DSN is identified based on a determination the namespace imbalance factor is greater than a threshold minimum value.

\* \* \* \* \*